US007643742B2

(12) United States Patent
Watanabe et al.

(10) Patent No.: US 7,643,742 B2
(45) Date of Patent: Jan. 5, 2010

(54) ELECTRONIC CAMERA, IMAGE PROCESSING APPARATUS, IMAGE PROCESSING METHOD AND IMAGE PROCESSING COMPUTER PROGRAM

(75) Inventors: Nobuyuki Watanabe, Yokohama (JP); Fumiyuki Shiratani, Sagamihara (JP); Hiroshi Matsuzaki, Tachikawa (JP); Satoko Furuki, Utsunomiya (JP); Akikazu Yachi, Hachioji (JP); Hideki Nagata, Hachioji (JP); Toru Matsuzawa, Kunitachi (JP)

(73) Assignee: Olympus Corporation, Tokyo (JP)

( * ) Notice: Subject to any disclaimer, the term of this patent is extended or adjusted under 35 U.S.C. 154(b) by 585 days.

(21) Appl. No.: 11/591,251

(22) Filed: Nov. 1, 2006

(65) Prior Publication Data

US 2007/0098396 A1     May 3, 2007

(30) Foreign Application Priority Data

Nov. 2, 2005     (JP)     ............................. 2005-319868

(51) Int. Cl.
    *G03B 17/18*    (2006.01)
(52) U.S. Cl. .......................... 396/60; 396/147; 396/287; 348/240.2; 348/333.05; 348/333.12; 348/346
(58) Field of Classification Search ................. 396/60, 396/147, 287; 348/240.2, 240.99, 333.05, 348/333.11, 333.12, 346
See application file for complete search history.

(56) References Cited

U.S. PATENT DOCUMENTS

| 5,229,589 | A | 7/1993 | Schneider |
| 6,073,145 | A | 6/2000 | Funabashi |
| 6,813,395 | B1 | 11/2004 | Kinjo |
| 7,376,347 | B2 * | 5/2008 | Sugimoto .................... 396/60 |
| 2002/0181784 | A1 | 12/2002 | Shiratani |
| 2003/0071908 | A1 | 4/2003 | Sannoh et al. |

FOREIGN PATENT DOCUMENTS

| EP | 1 589 478 A | 10/2005 |
| EP | 1 653 279 A | 5/2006 |
| JP | 5-268513 A | 10/1993 |
| JP | 6-217187 A | 8/1994 |

(Continued)

OTHER PUBLICATIONS

Notification Concerning Transmittal of International Search Report and Written Opinion of the International Searching Authority for PCT/JP2006/321582, dated Feb. 6, 2007, 7 sheets.

(Continued)

*Primary Examiner*—W B Perkey
(74) *Attorney, Agent, or Firm*—Frishauf, Holtz, Goodman & Chick, P.C.

(57) ABSTRACT

An electronic camera detects a person's face image from an object image obtained by photographing an object, executes an enlarging process on the detected face image so as to obtain a face image whose face size is suitable, and displays the face image which is enlarged into the suitable size on a display device. When a plurality of people are present on the object image, the enlarged face images are switched by an image operating switch. As a result, the switched face image is displayed on the display device.

13 Claims, 12 Drawing Sheets

FOREIGN PATENT DOCUMENTS

| | | |
|---|---|---|
| JP | 8-63597 A | 3/1996 |
| JP | 9-233384 A | 9/1997 |
| JP | 11-84481 A | 3/1999 |
| JP | 2002-354299 A | 12/2002 |
| JP | 2003-323615 A | 11/2003 |
| JP | 2004-240829 A | 8/2004 |
| JP | 2005-102175 A | 4/2005 |
| JP | 2005-269473 A | 9/2005 |
| JP | 2005-269563 A | 9/2005 |
| JP | 2007-41866 A | 2/2007 |
| WO | 2005-006072 A | 1/2005 |

OTHER PUBLICATIONS

Supplemental European Search Report and Written Opinion (in English) dated Oct. 6, 2009 issued in a counterpart European Application No. 06822543.2.

* cited by examiner

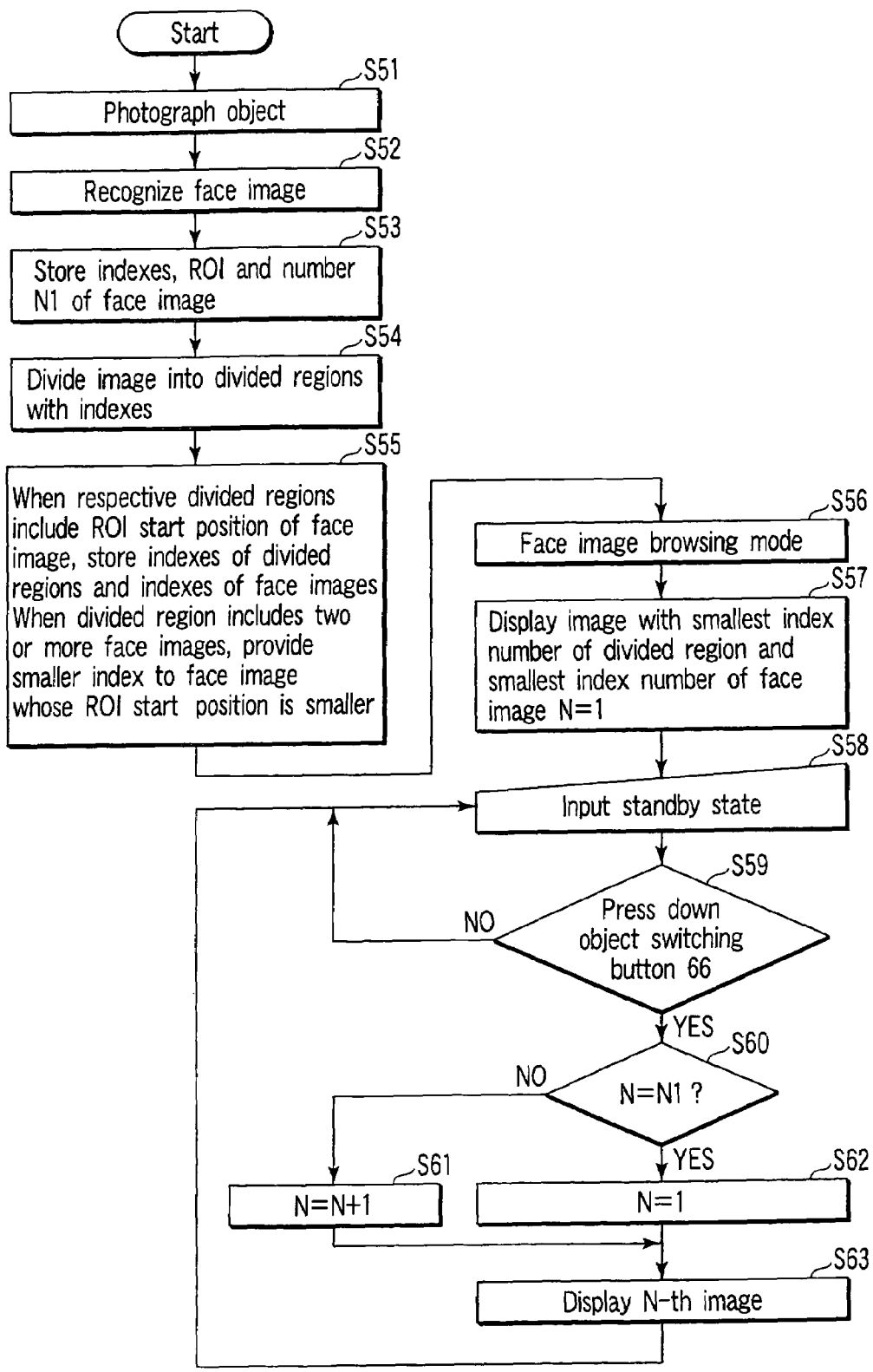
F I G. 10

ELECTRONIC CAMERA, IMAGE PROCESSING APPARATUS, IMAGE PROCESSING METHOD AND IMAGE PROCESSING COMPUTER PROGRAM

CROSS-REFERENCE TO RELATED APPLICATIONS

This application is based upon and claims the benefit of priority from prior Japanese Patent Application No. 2005-319868, filed Nov. 2, 2005, the entire contents of which are incorporated herein by reference.

BACKGROUND OF THE INVENTION

1. Field of the Invention

The present invention relates to an electronic camera, an image processing apparatus, and image processing method and an image processing computer program. More specifically, the invention relates to a technique for recognizing a photographed face image of an object.

2. Description of the Related Art

In electronic cameras, photographed images of objects can be checked on screens such as liquid crystal monitors provided on the rear surfaces of the cameras. As a result, in the case where an object is a person, a facial expression at the time of photographing can be checked.

As a technique for extracting a person's face, for example, Jpn. Pat. Appln. KOKAI Publication No. 8-63597 discloses a method of determining a face candidate region corresponding to a shape of a person's face and determining a face region from the feature quantity in the face candidate region so as to extract the person's face from a color original image.

As a unit that checks face images, for example, Jpn. Pat. Appln. KOKAI Publication No. 2004-240829 discloses a technique for detecting an edge from face portrait image data developed in a memory, extracting a pair of edges as candidates of both eyes, narrowing the candidates according to the feature of the person's face, estimating a face region in the facial portrait image data from the narrowed position of both eyes, obtaining a correcting amount from an average value of luminance in the estimated face region, and correcting the facial portrait image data according to the correcting amount so as to adjust brightness of the facial portrait image data.

Jpn. Pat. Appln. KOKAI Publication No. 6-217187 discloses a technique for adjusting a zoom so that the size of a face portion of an image becomes uniform so as to obtain a stable image even when an object moves.

Jpn. Pat. Appln. KOKAI Publication No. 2003-323615 discloses a technique for accepting a person's face image as a sample image, detecting a region in the vicinity of the face on the image input using a feature of the input sample image, displaying candidates of the detected region in the vicinity of the face on the image, and inputting a narrowing condition for the displayed candidate of the area in the vicinity of the face as to whether the displayed image is a face image so as to execute a face detecting process.

On the other hand, Jpn. Pat. Appln. KOKAI Publication Nos. 5-268513, 9-233384 and 11-84481 disclose techniques for, when a person's face image displayed on a screen is small, enlarging the face image by means of cropping so as to display it on the monitor screen.

BRIEF SUMMARY OF THE INVENTION

It is, therefore, an object of the present invention to provide an electronic camera that has a simple interface for, when a plurality of faces as objects are on an image, checking respective faces and good photographed state.

Therefore, according to the present invention, there is provided an electronic camera comprising an image processing section which, when a plurality of people are present in an object image, recognizes face images from the object image; an image operating section which accepts an instruction for sequentially switching the face images to be displayed on a display section; and a control section which controls the face images so that they are enlarged and sequentially switched to be displayed on the display section according to the instruction accepted by the image operating section.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a flowchart explaining the operation for checking a face image in the electronic camera according to a second modified example in the first embodiment of the present invention;

DETAILED DESCRIPTION OF THE INVENTION

Embodiments of the present invention will be explained below with reference to the drawings.

FIRST EMBODIMENT

Figure 1:
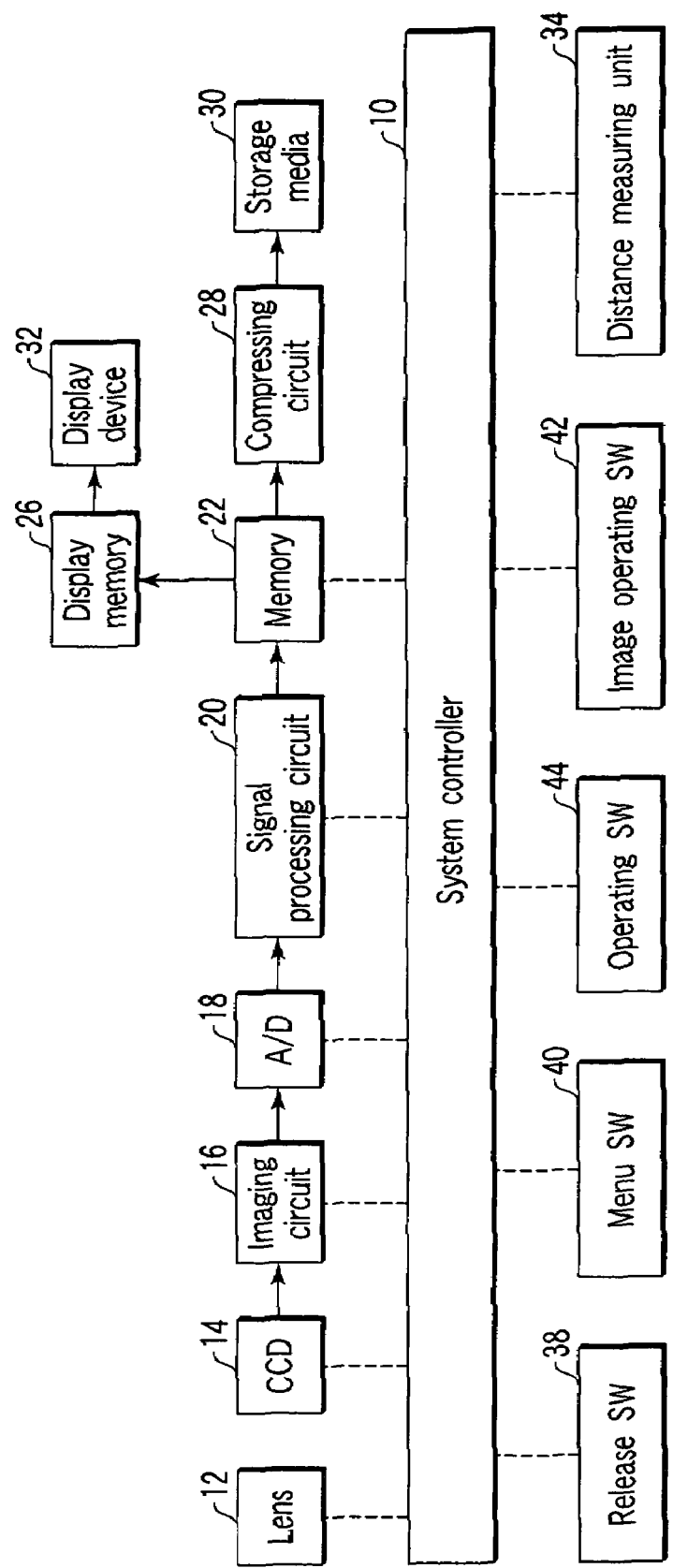
FIG. 1 is a block diagram illustrating a schematic constitution of an electronic camera according to a first embodiment of the present invention.

FIG. 1 is a block diagram illustrating a schematic constitution of an electronic camera according to a first embodiment of the present invention.

In FIG. 1, a system controller 10 is control means for controlling a control operation of the entire electronic camera, and is composed of a CPU or the like. The system controller 10 is connected to a photographing lens 12 which is built into a lens barrel, not shown, a CCD 14 as an imaging element which images an optical image of an object via the photographing lens 12, an imaging circuit 16 which converts the optical image captured by the CCD 14 into an electrical signal, an analog-to-digital converter 18, a signal processing circuit 20 and a memory 22. Further, the system controller 10 is connected to a distance measuring unit 34, a release switch (SW) 38, a menu switch (SW) 40, an image operating switch (SW) 42 and an operating switch (SW) 44. The memory 22 is connected to a storage media 30 via a compressing circuit 28 and to a display device 32 via a display memory 26.

The distance measuring unit 34 is for obtaining a focussing position of an object (not shown) according to automatic measurement of distance. The release switch 38 corresponds to a release button 52, mentioned later, for starting a photographing operation, and has a two-tiered constitution including a first release switch and a second release switch. When the release button 52 is half-pressed down, the first release switch is in an ON state so that photographing preparing operations such as a photometry process and a distance measuring process are performed. When the release button 52 is fully pressed down, the second release switch is turned on, so that an exposing operation is executed.

The menu switch 40 is for operating various functions of the electronic camera. The image operating switch 42 is for switching an image to be displayed on the display device 32. The image operating switch 42 is composed of a face image browsing mode switch 58, an image switching button 60, an object switching button 62 and the like, mentioned later. When these buttons are operated, an image to be displayed on the display surface of the display device 32 is switched. The operating switch 44 corresponds to an operating button such as a power switch necessary for operating the camera.

The photographing lens 12, the CCD 14, the imaging circuit 16, the analog-to-digital converter 18, the signal processing circuit 20, the memory 22, the display memory 26, the compressing circuit 28, the storage media 30, the display device 32, the distance measuring unit 34 are well known. For this reason, their details are omitted.

In such a constitution, an optical image of an object which passes through the photographing lens 12 is converted into an electric signal by the CCD 14, and the electric signal is converted into an analog image signal by the imaging circuit 16. The analog image signal is converted into a digital image signal (hereinafter, "image information") by the analog-to-digital converter 18, and a process for converting color information of the image information, a pixel count converting process, a process for recognizing a face image and the like are executed in the signal processing circuit 20. The image information which is subject to various image processes by the signal processing circuit 20 is stored in the nonvolatile memory 22. The memory 22 is composed of a high-speed storage unit, for example, SDRAM, and is used also as a work area for an image process, mentioned later.

The image information which is once stored in the memory 22 is compressed into JPEG format, for example, by the compressing circuit 28, and is stored in the storage media 30 such as smart media (registered trademark). The image signal which is subject to the signal process is transferred from the memory 22 to the display memory 26, and is displayed on the display device 32 via a driving circuit, not shown.

When the image stored in the storage media 30 is displayed, the stored image is decompressed by an expanding circuit, not shown, and after the image is subject to a predetermined image process by the signal processing circuit 20, the image is displayed on the display device 32 similarly to the photographing case.

Figure 3:
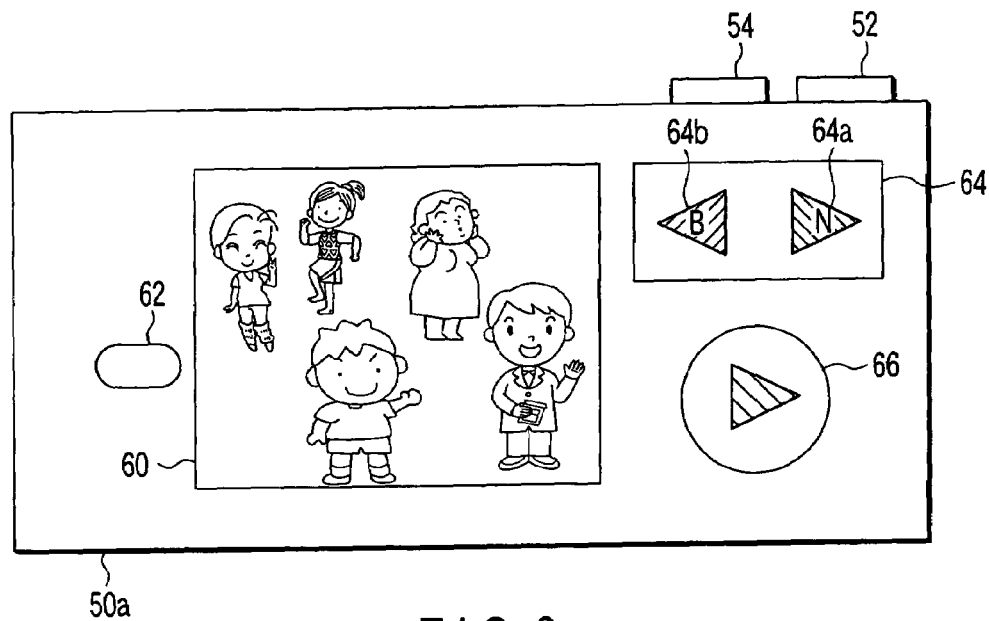
FIG. 3 is a rear view viewed from a rear side of the electronic camera illustrating the constitution of the electronic camera according to a first embodiment of the present invention.

FIG. 3 is a rear view viewed from a rear side of the electronic camera illustrating a constitution of the electronic camera according to the first embodiment of the present invention.

In FIG. 3, the release button 52 corresponding to the release switch 38, and a photographing mode switch 54 for selecting a photographing mode are provided above a camera main body 50a. A liquid crystal display 60 as the display device 32 is provided to an approximately center of a rear side of the camera main body 50a.

A face image browsing mode switch 62 for operating a face image browsing mode whose details are mentioned later is provided to the left side of the liquid crystal display 60. On the other hand, the right side of the liquid crystal display 60 is provided with an image switching button 64 for switching one frame of image currently displayed on the liquid crystal display 60, and an object switching button 66 for switching to select an object displayed on the liquid crystal display 60. In this case, the image switching button 64 is composed of a switching button 64a for switching an image into an image one frame after the currently displayed image so as to display it, and a switching button 64b for switching an image into an image one frame before the current displayed image so as to display it.

Figure 4:
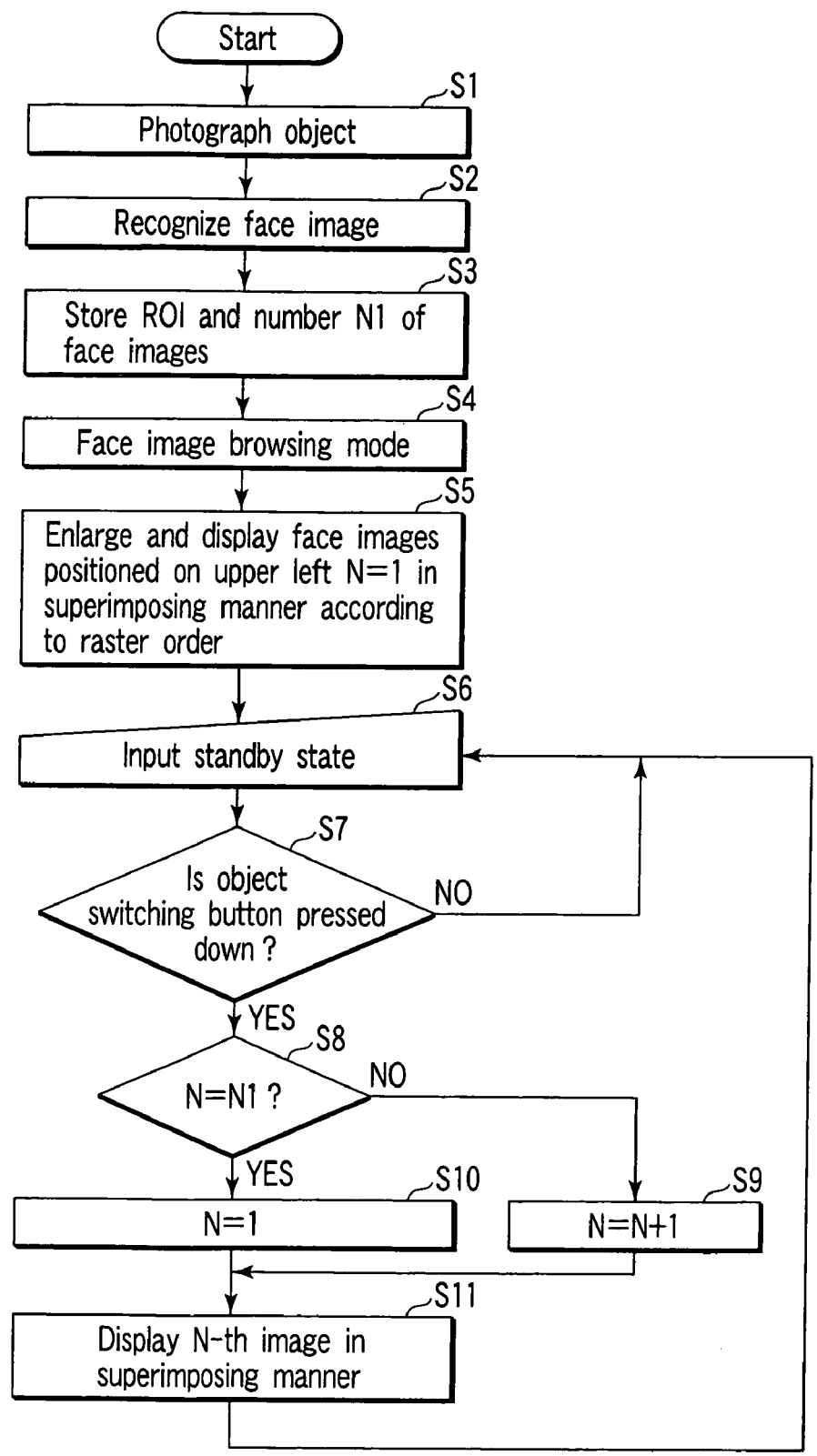
FIG. 4 is a flowchart explaining an operation for checking a face image in the electronic camera according to the first embodiment of the present invention.

With reference to the flowchart in FIG. 4, an operation for checking a face image in the electronic camera according to the first embodiment is explained below.

Figure 5:
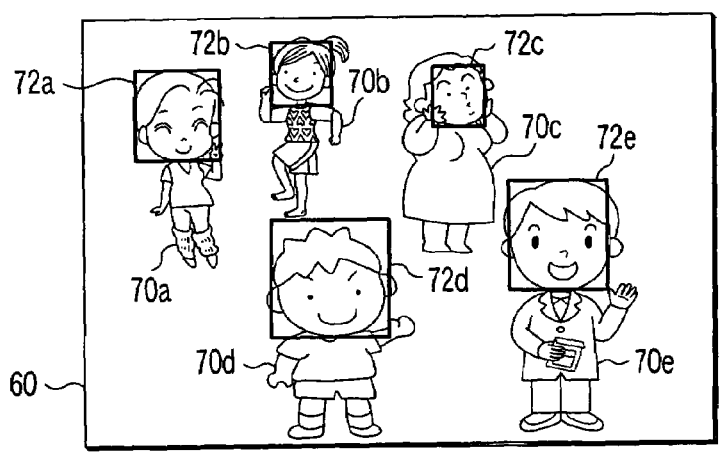
FIG. 5 is a diagram illustrating examples of object images and regions of interest to be displayed on a liquid crystal display 60 in a display device of FIG. 1.

When a power switch, not shown, is turned on, an object is photographed in step S1. In this case, as shown in FIG. 5, a plurality (in this case, five) of people 70a to 70e are present in an object image obtained by photographing objects. When the objects are photographed in step S1, the image is transmitted from the CCD 14 via the imaging circuit 16 and the analog-to-digital converter 18 to the signal processing circuit 20 as mentioned above. The signal processing circuit 20 then executes a color information converting process, a pixel count changing process, a face image recognizing process and the like in step S2. The face image recognizing process is well known, and since its detail is described in, for example, Jpn. Pat. Appln. KOKAI Publication No. 2004-240829, its explanation is omitted.

The signal processing circuit 20 determines regions of interest (ROI) as regions according to the face images in step S3. The regions of interest and the number of the objects' faces N1 (=5) are stored in the memory 22. For example, an image shown in FIG. 5 is displayed on the liquid crystal display 50. In this case, the region of interest for the face image includes five regions designated by 72a to 72e correspondingly to people 70a to 70e. The sizes of the region of interest, coordinate start positions and the like of these regions are stored in the memory 22. Also image information about results of the color information converting process and the image count converting process are stored in the memory 22.

Figure 6A:
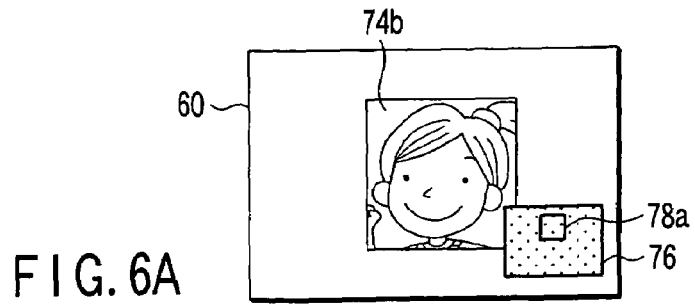
FIG. 6A is a diagram illustrating an example of superimposed display of the enlarged image in a region of interest 72b of FIG. 5, an image frame and a display region.

The face image browsing mode switch 62 is pressed down in step S4, and the face image browsing mode is executed according to the following steps. The face image in the region of interest positioned on the upper left portion of the screen is enlarged to be displayed in the raster order based on the contents in the memory 22 in step S5. "1" is set as the face image N. In this case, as shown in FIG. 5, the region of interest 72b having the higher order in the raster order, namely, the face image of the person 70b is displayed as an enlarged image 74b on the liquid crystal display 60 as shown in FIG. 6A.

At this time, a position on the screen of FIG. 5, which corresponds to the region of interest 72b to be displayed as the enlarged image 74b, is displayed on the liquid crystal display 60 in a superimposing manner. That is to say, a screen frame 76 displayed in the superimposing manner shows the entire screen of the liquid crystal display 60. A display region 78a in the screen frame 76 corresponds to the region of interest 72b in FIG. 5. A user, therefore, can check the enlarged image 74b shown in FIG. 6A and simultaneously the position on the screen where the enlarged image 74b is present on the liquid crystal display 60.

Thereafter, the camera is in an input standby state in step S6. A state of the object switching button 66 is detected in step S7. When the object switching button 66 is pressed down, the sequence goes to step S8, but when it is not pressed down, the sequence goes to step S6. That is to say, steps S6 and S7 are repeated until the object switching button 66 is pressed down.

On the other hand, when the detection is made in step S7 that the object switching button 66 is pressed down, the sequence goes to step S8, so that a determination is made whether the face image N set in step S5 is N1. In this case, since "1" is set as N in step S5 and "5" is set as the number of the object's faces N1 in step S3, the sequence goes to step S9 so that N is incremented.

Figure 6B:
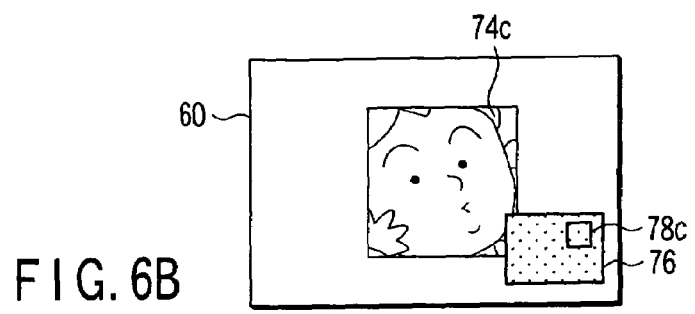
FIG. 6B is a diagram illustrating an example of a superimposed display of the enlarged image in a region of interest 72c of FIG. 5, an image frame and a display region.

The region of interest related to the face image of the N-numbered object is enlarged to be displayed on the liquid crystal display 60 in step S11. In this case, since incrementing is carried out in step S9, the face image of N=2 is displayed. That is to say, as shown in FIG. 5, the region of interest 72c on the second-highest order of the raster order, namely, the face image of the person 70c is displayed as an enlarged image 74c on the liquid crystal display 60 as shown in FIG. 6B. At the same time, a display region 78c in the screen frame 76 corresponding to the region of interest 72c in FIG. 5 is displayed on the liquid crystal display 60 in the superimposing manner. Thereafter, the sequence goes to step S6 so that the camera is in the input standby state.

Figure 6C:
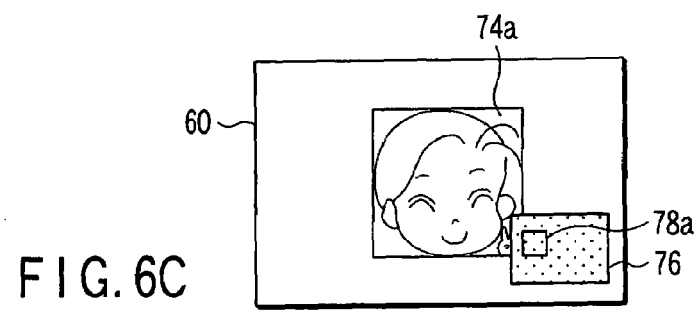
FIG. 6C is a diagram illustrating an example of superimposed display of the enlarged image in a region of interest 72a of FIG. 5, an image frame and a display region.
Figure 6D:
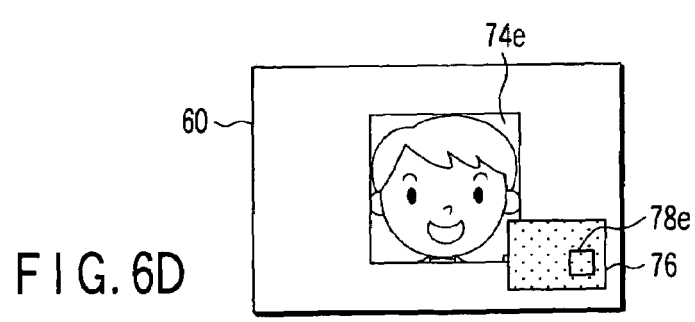
FIG. 6D is a diagram illustrating an example of superimposed display of the enlarged image in a region of interest 72e of FIG. 5, an image frame and a display region.
Figure 6E:
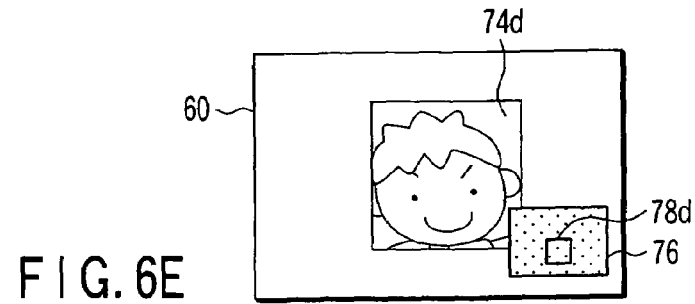
FIG. 6E is a diagram illustrating an example of superimposed display of the enlarged image in a region of interest 72d of FIG. 5, an image frame and a display region.

The processing operations in steps S6 to S9 and S11 are repeated until N=N1 is established in step S8. That is to say, in the first embodiment, the enlarged image 74b, the screen frame 76 and the display region 78a (see FIG. 6A) are displayed on the liquid crystal display 60 firstly. Thereafter, every time when the object switching button 66 is pressed down, the enlarged image 74c, the screen frame 76 and a display region 78c (see FIG. 6B) are displayed, an enlarged image 74a, the screen frame 76 and a display region 78a (see FIG. 6C) are displayed, an enlarged image 74e, the screen frame 76 and a display region 78e (see FIG. 6D) are displayed, and an enlarged image 74d, the screen frame 76 and a display region 78d (see FIG. 6E) are displayed sequentially on the liquid crystal display 60.

When N=N1 is established in step S8, the sequence goes to step S10, and "1" is set as N is again. This is because the number of the face images of the objects (people) is five in this embodiment, and when the object switching button 66 is pressed down four times, the face image of the fifth person is enlarged to be displayed. Therefore, when the object switching button 66 is pressed down five times, the first enlarged screen 74b is displayed next, and the face image N is again set to "1" in step S10. As a result, the enlarged image 74b of the N-th object, namely, the first object, the screen frame 76 and the display region 78a are displayed on the liquid crystal display 60 at next step S11.

Since reducing and enlarging processes are executed on image information in the respective regions of interest, the enlarged images 74a to 74e are displayed with the approximately same size on the liquid crystal display 60.

According to the first embodiment, even in the case where a plurality of faces are photographed as objects, the object switching button 66 is operated, and a plurality of face images are selectively switched so as to be capable of being displayed in the approximately same size. Therefore, the respective faces and a good photographed state are easily checked.

A position on the photographed image, in which the enlarged image currently displayed on the liquid crystal display 60 is present, can be easily checked by the screen frame 76 and the display regions 78a to 78e to be displayed on the liquid crystal display 60.

In the first embodiment, the sizes of the region of interest and the coordinate start positions are stored, but the present invention is not limited to this, and thus the center point of the region of interest may be stored. In this case, the raster order is different from the display order in FIG. 6.

In the case where the photographing mode for user's photographing and the face image browsing mode for browsing the face images in the display device 32 are provided, the processes after step S2 can be executed under the condition that the face image browsing mode is specified by the user. In this case, when a detection is made that the face image browsing mode switch 62 is operated, a detection may be made that the face image browsing mode is specified by the user. Step S4 is omitted.

Figure 2A:
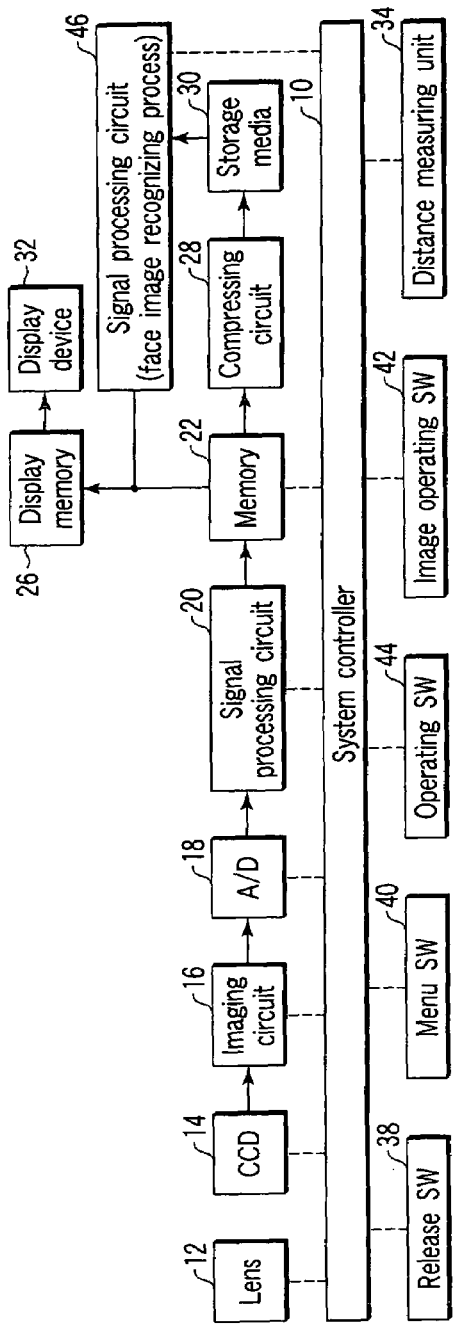
FIG. 2A is a block diagram illustrating a schematic constitution of the electronic camera according to a modified example 1 of a modification of the present invention.

As shown in FIG. 2A, in the case of a modified example where the signal processing circuit 46 is added to the constitution, an object image can be selected from a plurality of images saved in the storage media 30 at a reproducing mode for user's browsing of a photographed object image. That is to say, the object image is selected by the user at the reproducing mode, and the signal processing circuit 46 executes the processes after step S2 on the object image selected instead of the object image from the analog-to-digital converter 18 under the condition that the face image browsing mode is specified by the user. In this case, step S4 is omitted, and the user's selection of the object image is accepted by the operation of the image switching button 64, and the specifying of the face image browsing mode can be accepted by the operation of the face image browsing mode switch 62.

Figure 2B:
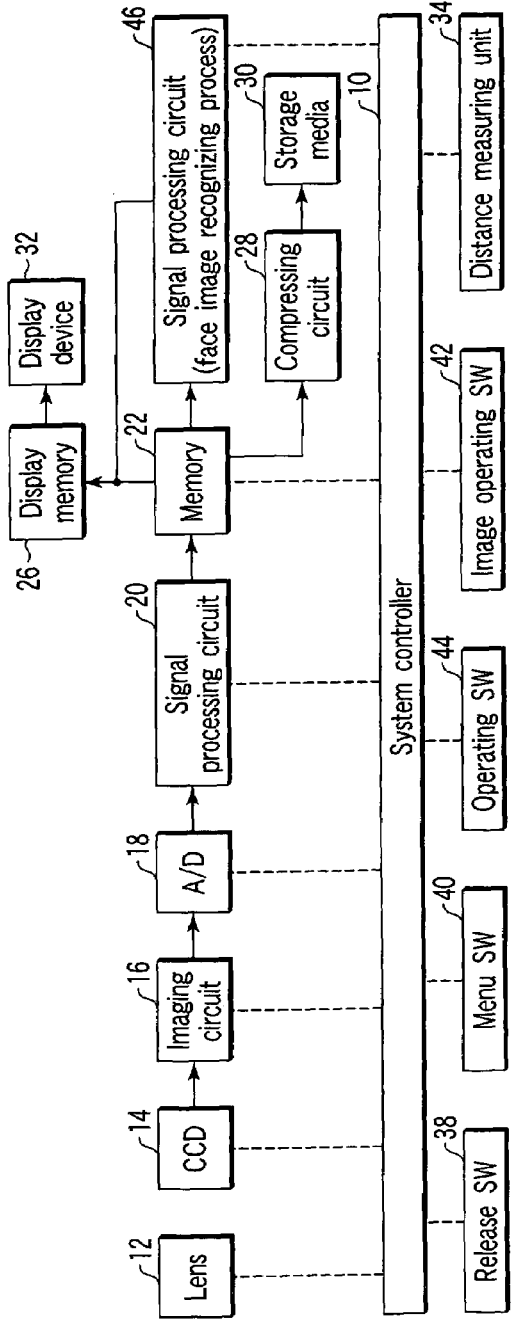
FIG. 2B is a block diagram illustrating a schematic constitution of the electronic camera according to a modified example 2 of a modification of the present invention.

The electronic camera can be constituted like the modified example shown in FIG. 2B. In the example of FIG. 2B, after the signal processing circuit 20 executes the color information converting process, the pixel count converting process and the like on the image information (object image) from the analog-to-digital converter 18, the image information is stored in the memory 22. In the example of FIG. 2B, the image information stored in the memory 22 is transmitted to the compressing circuit 28 so as to be compressed as mentioned above and is transmitted to the signal processing circuit 46 for recognizing the face images. The processes after step S2 are executed on the image information. In this case, step S4 is omitted.

When the face image browsing mode switch 36 is pressed down in step S6, the photographing mode or the reproducing mode is selected.

A first modified example in the first embodiment of the present invention is explained below.

In the first embodiment described above, only one object switching button 66 is provided to the camera main body 50a, and every time when the object switching button 66 is pressed down, the enlarged images are switched to be displayed sequentially according to the raster order. In the first modified example of the first embodiment, four object switching buttons are provided, and desired enlarged images can be switched to be displayed according to the user's selection.

The first modified example of the first embodiment is explained below.

Figure 7:
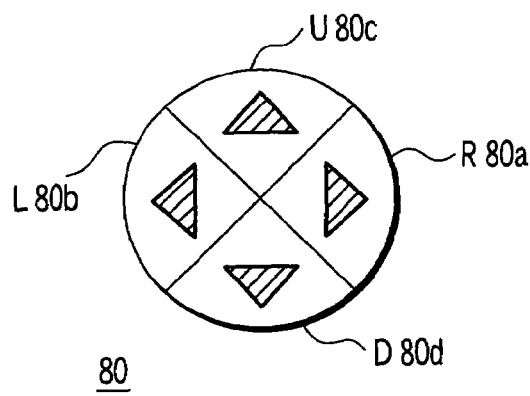
FIG. 7 is a diagram illustrating a constitutional example of an object switching button according to a first modified example in the first embodiment of the present invention.

FIG. 7 is a diagram illustrating a constitutional example of the object switching button according to the first modified example of the first embodiment.

In FIG. 7, the object switching button 80 is composed of a switching button (R) 80a for switching an image into an image one frame after so as to display it, a switching button (L) 80b for switching an image into an image one frame before so as to display it, a switching button (U) 80c for enlarging an image, and a switching button (D) 80d for reducing an image.

Figure 8:
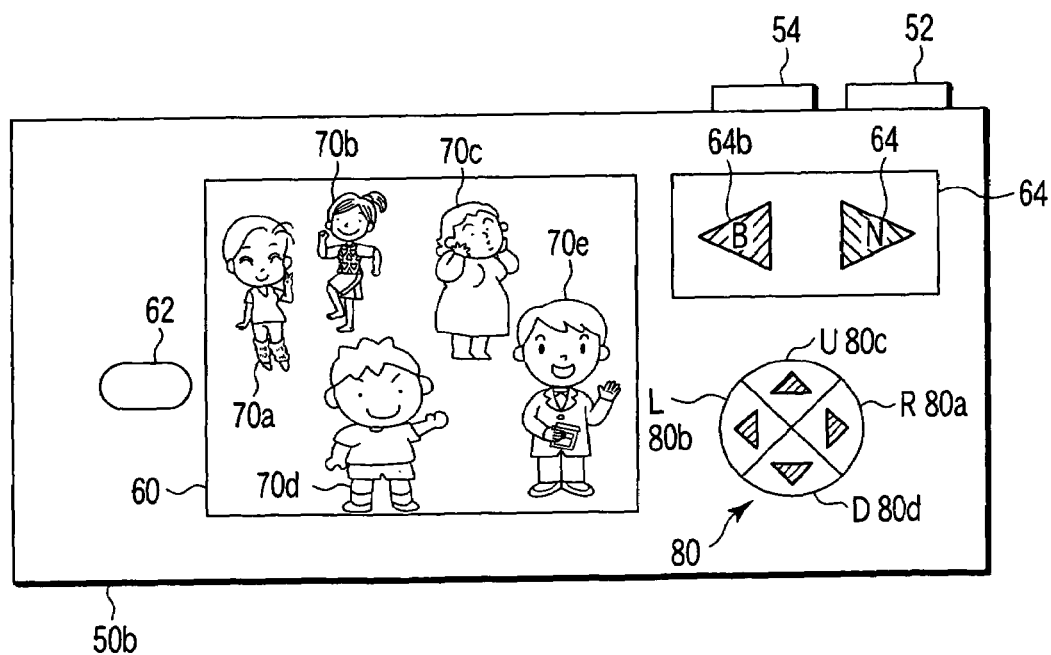
FIG. 8 is a rear view viewed from the rear side of the electronic camera illustrating a constitution of the electronic camera according to the first modified example in the first embodiment of the present invention.

The camera main body 50b provided with the object switching button 80 is constituted as shown in FIG. 8. In the first modified example, since the part of the constitution other than the object switching button 80 is the same as that in the first embodiment, like members are designated by like reference numerals and the explanation thereof is omitted.

Figure 9:
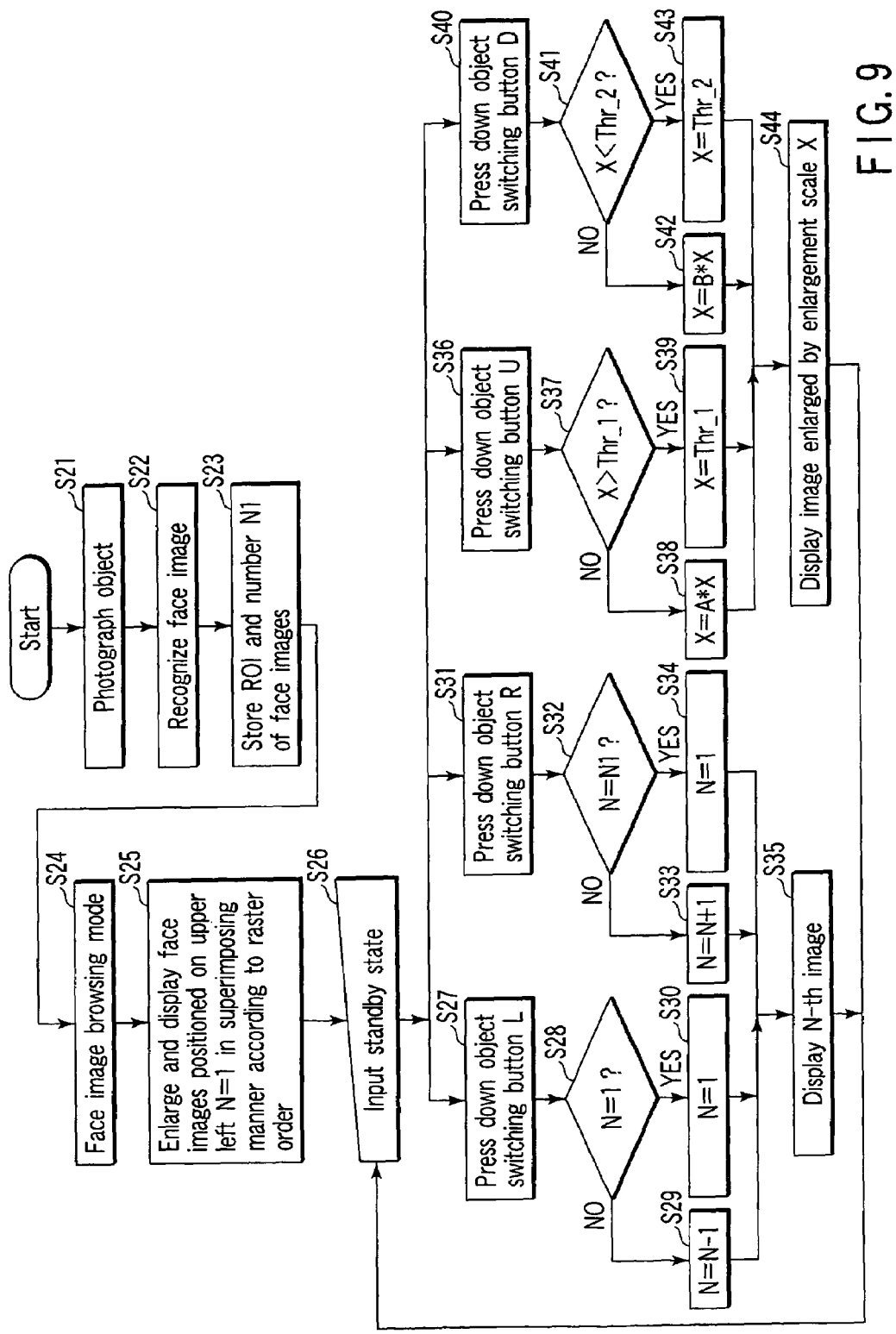
FIG. 9 is a flowchart explaining an operation for checking a face image in the electronic camera according to the first modified example in the first embodiment of the present invention.

FIG. 9 is a flowchart explaining the operation for checking a face image in the electronic camera according to the first modified example in the first embodiment. The processing operations in steps S21 to S25 are similar to those in the explanation related to steps S1 to S5 in the flowchart of FIG. 4.

When the power switch, not shown, is turned on, objects are photographed in step S21. The well-known face image recognizing process is executed in step S22. The regions of interest (ROI) of face images and the number of objects' faces N1 on the screen are stored in the memory 22 in step S23. The face image browsing mode switch 36 is pressed down in step S24, so that the face image browsing mode is executed. The face image in an upper left part of the screen is enlarged and displayed in the raster order in step S25, so that the face image N is set to "1".

The camera is in the input standby state in step S26, and a button of the object switching buttons 80 which is pressed down is detected. That is to say, when the object switching button (L) 80b is pressed down, the sequence goes to step S27, and when the object switching button (R) 80a is pressed down, the sequence goes to step S31. When the object switching button (U) 80c is pressed down, the sequence goes to step S36, and when the object switching button (D) 80d is pressed down, the sequence goes to step S40.

In the case where the object switching button (L) 80b is pressed down in step S27, a determination is made in step S28 whether the face image N set in step S25 is N1. When N is "1", the sequence goes to step S30, and the face image N=1 is set. Further, the sequence goes to step S35, and the region of interest relating to the image face of the first object is enlarged to be displayed on the liquid crystal display 60.

On the other hand, when N is not "1" in step S28, the sequence goes to step S29, and N is decremented. As mentioned later, this is executed in order to display an face image of the last object in the case where the face images of the second and after objects are displayed by the object switching button (R) 80a. As a result, for example, the enlarged image 74c shown in FIG. 6B is switched into the enlarged image 74b shown in FIG. 6A.

In the case where the object switching button (R) 80a is pressed down in step S31, a determination is made in step S32 whether the face image N is equal to the number N1 of the objects' faces on the screen set in step S25. When N is not equal to N1, the sequence goes to step S33, so that N is incremented. The incremented face image of the N-th object is enlarged to be displayed on the liquid crystal display 60 in step S35.

On the other hand, when N=N1 is established in step S32, the sequence goes to step S34, N is again set to "1". This is because similarly to the first embodiment, when the display reaches the number of the face images of the objects set in steps S23, the display returns to the face image of the first object. Therefore, at next step S35, the face image of the N-th, namely, the first object is enlarged to be displayed on the liquid crystal display 60.

After the enlarged display in step S35, the sequence goes to step S26 so that the camera is in the input standby state.

In the case where the object switching button (U) 80c is pressed down in step S36 in the input standby state in step S26, the sequence goes to step S37 so that a current enlargement scale X is compared with a predetermined maximum threshold value of the enlargement scale Thr_1. When the enlargement scale X is not more than the predetermined maximum threshold value Thr_1 of the enlargement scale X, the sequence goes to step S38 so that the current enlargement scale X is set to a predetermined scale A (for example, x 1.1). The sequence then goes to step S44, and the face image displayed in step S25 or S35 is displayed at the enlargement scale X set in step S38 on the liquid crystal display 35.

On the other hand, when the enlargement scale X exceeds the predetermined maximum threshold value Thr_1 of the enlargement scale in step S37, the sequence goes to step S39, so that the maximum threshold value of the predetermined enlargement Thr_1 is set as the current enlargement scale X. The sequence then goes to step S44, and the face image displayed in step S25 or S35 is displayed at the enlargement scale X set in step S38 on the liquid crystal display 60.

In the case where the object switching button (D) 80d is pressed down in step S40 in the input standby state in step S26, the sequence goes to step S41 so that the current enlargement scale X is compared with a predetermined minimum threshold value of the enlargement scale Thr_2. When the enlargement scale X is not less than the predetermined minimum threshold value of the enlargement scale Thr_2, the sequence goes to step S42 so that the current enlargement scale X is reduced to a predetermined scale B (for example, B=x 1/A). The sequence then goes to step S44, and the face image displayed in step S25 or S35 is displayed at the enlargement scale X set in step S42 on the liquid crystal display 60.

On the other hand, when the enlargement scale X is less than the predetermined minimum threshold value of the enlargement scale Thr_2 in step S41, the sequence goes to step S43, and the predetermined minimum threshold value of the enlargement scale Thr_2 is set as the current enlargement scale X. The sequence goes to step S44, and the face image to be displayed in step S25 or S35 is displayed at the enlargement scale X set in step S43 on the liquid crystal display 60.

After the enlarged display in step S44, the sequence goes to step S26, and the camera is in the input standby state.

According to the first modified example in the first embodiment, similarly to the first embodiment described above, even in the case where a plurality of faces are photographed as objects, the object switching buttons 80a to 80d are operated so that the plural face images can be selectively switched so as to be displayed with the approximately same size, and the face images can be changed into desired sizes so as to be displayed.

In the first modified example, it goes without saying that the screen frames and the display regions can be displayed on the liquid crystal display in the superimposing manner. A position on the photographed image where the enlarged image displayed on the liquid crystal display 60 is present can be easily checked by the display regions 78a to 78e.

In the first modified example, the size of the region of interest and the coordinate start position are stored, but the center point of the range of interest, a point on the upper left of the region of interest or the like may be stored as the raster order. In this case, the raster order is different from the display order shown in FIG. 6.

A second modified example in the first embodiment of the present invention is explained below.

In the first embodiment and the first modified example, the face images on the left part of the screen are sequentially enlarged to be displayed in the raster order. When, however, the face images are tried to be displayed precisely according to the raster order, this makes a difference between the raster order and the user's perception of the order from upper left to lower right. For this reason, in the second modified example, an image on the monitor screen is divided into a plurality of divided regions, and the images on the regions are displayed according to the divided order.

The operation for checking face images in the electronic camera according to the second modified example in the first embodiment of the present invention is explained with reference to the flowchart in FIG. 10.

In the second modified example in the first embodiment, since the constitution and the basic operation of the electronic camera are the same as those in the first embodiment, like members are designated by like numbers and the explanation thereof is omitted.

Figure 11:
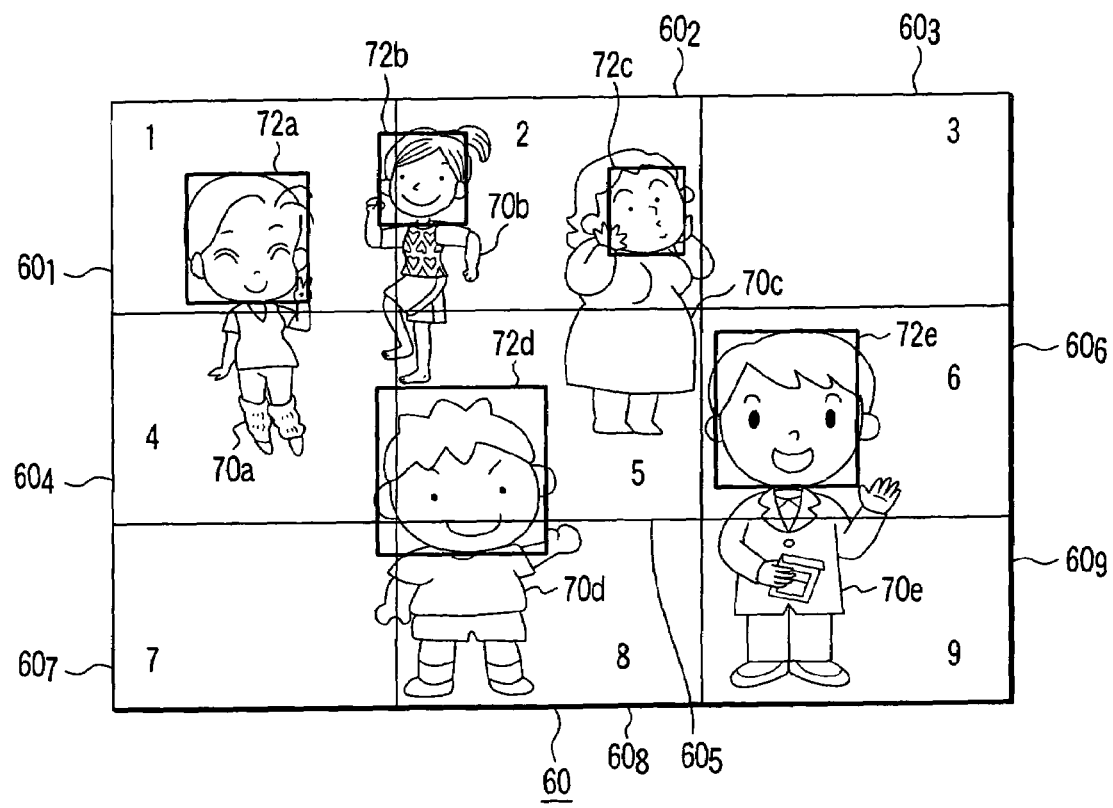
FIG. 11 is a diagram illustrating an example where an object image obtained by the electronic camera is divided into small regions according to the second modified example in the first embodiment of the present invention.

When the power switch, not shown, is turned on, objects are photographed in step S51. In this case, a plurality of people (in this case, five) 70a to 70e are present as the objects as shown in FIG. 11. When the objects are photographed in step S51, the face image recognizing process is executed in step S52. Similarly to step S2, the processes after step S52 may be executed after specifying of the face image browsing mode is accepted.

Indexes of the face images, the region of interest (ROI) and the number N1 (=5) of the objects' faces on the screen are stored in the memory 22 in step S53. For example, an image shown in FIG. 11 is displayed on the liquid crystal display 60. In this case, the five regions of interest for the face images are designated by 72a to 72e for respective people 70a to 70e. Information about them are stored. Further, the object image is divided into divided regions with indexes in step S54. In this case, the object image is divided into nine divided regions (1) $60_1$ to (9) $60_9$ as shown in FIG. 11. The divided regions (1) to (9) indicate the numbers 1 to 9 given to the respective regions in FIG. 11.

In the case where the respective regions divided in step S54 include start positions of the regions of interest for the face images, respectively, the indexes of the divided regions and the indexes of the face images are stored in step S55. In the case where one divided region includes two or more face images, a face image where the start position of the region of interest is smaller has small index. For example, when the center points of the regions of interest are expressed by the raster order, in the case of the object image shown in FIG. 11, the face images of two people 70b and 70c are present in the divided region (2) $60_2$. However, the region of interest 72b whose start position is smaller has an index smaller than that of the region of interest 72c.

The face image browsing mode switch 62 is pressed down in step S56, so that the face image browsing mode is executed. At next step S57, an image, where the index number of its divided region and the index number of its face image are the smallest, is enlarged to be displayed, and the face image N is set to "1". Thereafter, the sequence goes to step S58, and the camera is in the input standby state. Since the respective processing operations in steps S58 to S63 are similar to steps S6 to S11 in the flowchart of FIG. 4, corresponding step numbers are referred to and the explanation thereof is omitted.

According to the second modified example, in the case where, for example, the people 70a to 70e are present in the positions as shown in FIG. 11, the enlarged images in the regions of interest 72a, 72b, 72c, 72d and 72e are displayed sequentially in this order. As a result, a difference between the order of actually displaying the enlarged images and the user's perception can be prevented.

Also in the second modified example, the screen frame and the display region can be displayed on the liquid crystal display in the superimposing manner. Further, in the second modified example, as to the raster order, the center point of the region of interest is used, but an upper left point of the region of interest or the like may be used.

In the second modified example, the object switching button 66 is operated to switch the image of the object's face to another, as explained above. Instead, four object switching buttons 80a to 80d may of course be used to switch the image, as in the fist modified example described above.

SECOND EMBODIMENT

A second embodiment of the present invention is explained below.

In the first embodiment, the enlarged images are displayed in the raster order, but in the second embodiment, evaluated values of recognition of the objects' face images are calculated, so that the display of the enlarged images is switched according to the order of the evaluated values.

In the second embodiment described below, since the constitution and the basic operation of the electronic camera are the same as those in the first embodiment described above, like members are designate by like reference numerals and the explanation thereof is omitted.

Figure 12:
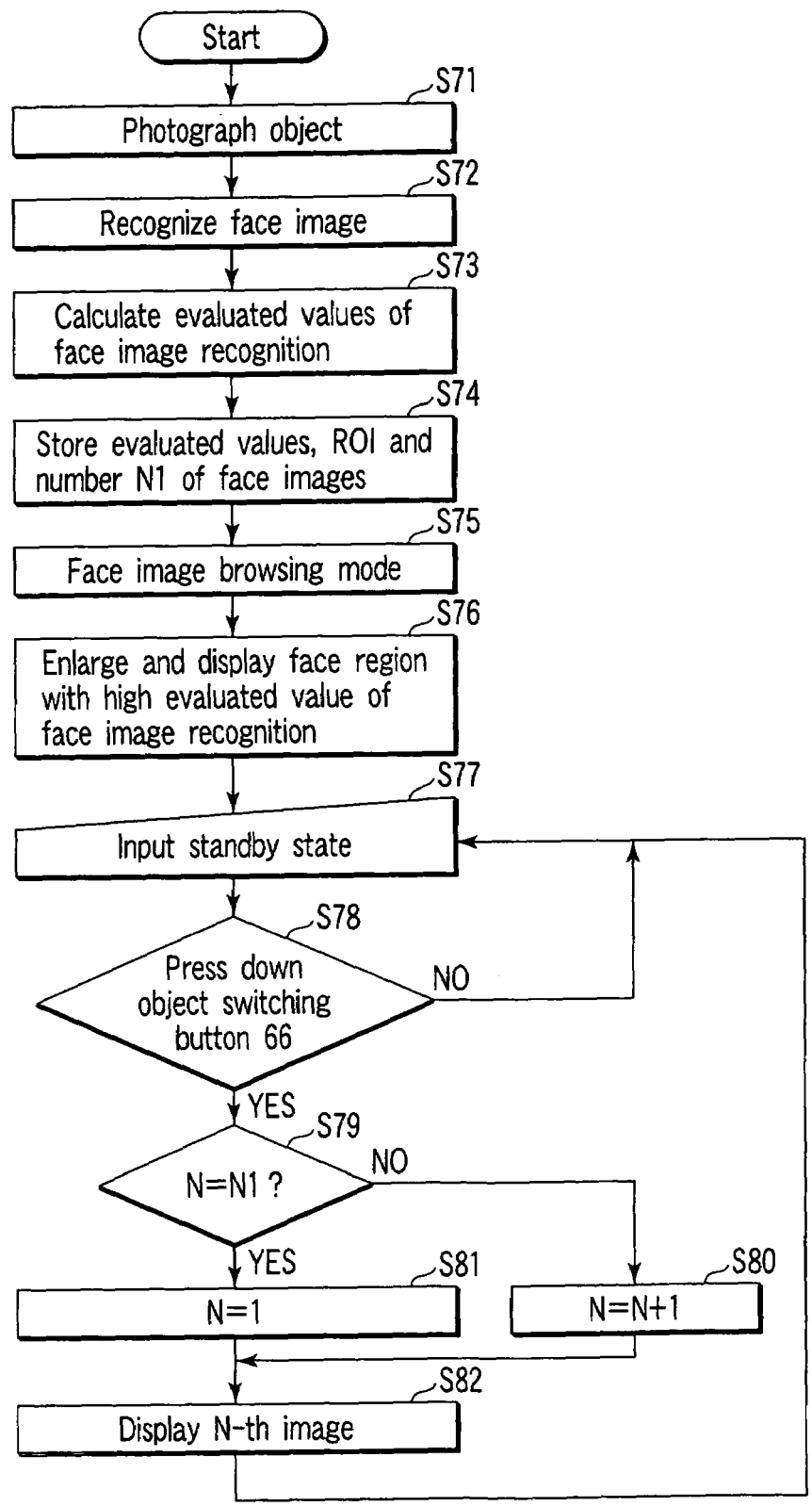
FIG. 12 is a flowchart explaining the operation for checking a face image in the electronic camera according to a second embodiment of the present invention.

The operation for checking face images in the electronic camera according to the second embodiment of the present invention is explained below with reference to the flowchart in FIG. 12.

When the power switch, not shown, is turned on, the objects are photographed in step S71, and face images are recognized in step S72. The evaluated values of the face image recognition are calculated in step S73. Similarly to the case in step S2, the processes after step S72 may be executed after the specifying of the face image browsing mode is accepted.

The evaluated values are determined by the degree of similarity which is also called a matching degree with respect to templates having predetermined facial shape in the recognizing method for recognizing a person's face from an image. In the face image recognizing method utilizing the matching degree, plural types of face-shaped templates are prepared, the matching degree between the templates and an image is calculated according to normalization intercorrelation, and a template having the highest matching degree is selected. When the highest matching degree is not less than a predetermined threshold value, a region in the selected template is determined as a face candidate region. Such a recognizing method is disclosed in Jpn. Pat. Appln. KOKAI Publication No. 2004-240829.

In addition to the method of calculating the matching degree between face shape and a template, for example, an eye region may be extracted so that a face region is recognized in the face candidate region, or a mouth, hair, a neck and the like are extracted from eye position information so that a face region may be recognized.

The evaluated values of the face image, the regions of interest and the number N1 (=5) of the regions of interest are stored in the memory 22 in step S74. For example, in the case where the image shown in FIG. 5 is displayed on the liquid crystal display 60, the regions of interest for the face image include the five regions of interest 72a to 72e for respective people 70a to 70e. When the face image browsing mode switch 62 is pressed down, the face image browsing mode is executed in step S75. The face image with the highest evaluated value of the face image recognition calculated in step S73 is enlarged to be displayed in step S76, and the face image N is set to 1. In this case, the face images N having the higher evaluated values calculated in step S73 are set to "1", "2", . . . in this order.

Thereafter, the camera is in the input standby state in step S77. The state of the object switching button 66 is detected in step S78. The processes in steps S77 and S78 are repeated until the object switching button 66 is pressed down. In the case where the pressing-down of the object switching button 66 is detected in step S78, the sequence goes to step S79 so that a determination is made whether the set face image N set in step S76 is N1.

The sequence goes to step S80 and the N is incremented until face image N is equal to N1. The region of interest relating to the object's face image with N-th evaluated value is enlarged to be displayed on the liquid crystal display 60 in step S82. On the other hand, when the face image N is equal to N1 in step S79, the sequence goes to step S81, and the face image N is set to "1" so that the first face image is displayed. Thereafter, when the original image is display in step S82, the camera is again in the input standby state in step S77.

According to the second embodiment, since the face images are switched to be displayed sequentially in decreasing order of the evaluated values of the face image recogni-tion, the high-precision face image can be checked for the faces and a good photographed state.

Also in the second embodiment, it goes without saying that the screen frame and the display region can be displayed on the liquid crystal display in the superimposing manner.

In the second embodiment, the face images are displayed on the liquid crystal display sequentially in decreasing order of the evaluated values of the face image recognition, but the present invention is not limited to this, and thus they may be displayed in increasing order of the evaluated values.

In the second embodiment, the face images are switched by the object switching button 66, but the present invention is not limited to this, and thus the four object switching buttons 80a to 80d may be used like the first modified example of the first embodiment.

As to the evaluated value of the face image recognition, for example, an attention is paid to eye portions of objects, and eye shutting states are evaluated by the method disclosed in Jpn. Pat. Appln. KOKAI Publication No. 2003-287784 so that the images may be displayed in decreasing order or increasing order of the evaluated values.

THIRD EMBODIMENT

A third embodiment of the present invention is explained below.

In the third embodiment, the enlarged face images are displayed in such a manner that focus estimated positions are switched in order of being closer to the camera in cooperation with focus detection.

In the third embodiment, since the constitution and the basic operation of the electronic camera are the same as those in the first and the second embodiments, like members are designated by like reference numerals and the explanation thereof is omitted.

Figure 13:
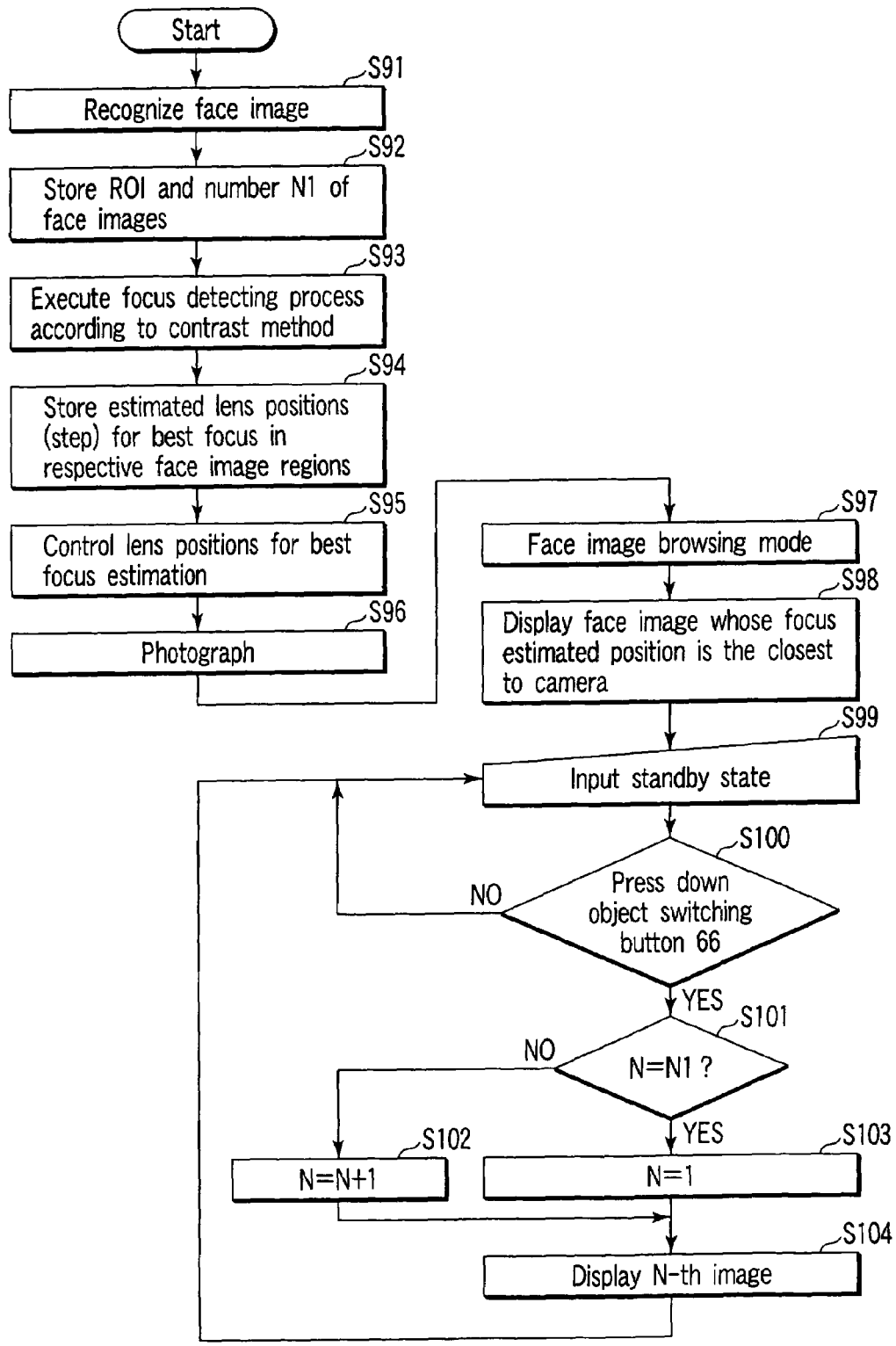
FIG. 13 is a flowchart explaining the operation for checking the face image in the electronic camera according to a third embodiment of the present invention.

The operation for checking face images in the electronic camera according to the third embodiment of the present invention is explained below with reference to a flowchart in FIG. 13.

When the power switch, not shown, is turned on, the well-known face image recognizing process is executed in step S91. The regions of interest and the number of regions of interest N1 on the face images are stored in step S92. The distance measuring unit 34 executes a focus detecting process according to a well-known contrast method in step S93. The contrast method is disclosed in, for example, Japanese Patent Publication No. 2507144.

An estimated lens position (step number) of the photographing lens 12 where the focus is the best, namely, the evaluated value is the largest in the regions of interest on the images is stored in the memory 22 in step S94. The focus position stored in step S94 is controlled as the lens position to be the best focus in step S95, and photographing is carried out in step S96.

After photographing, when the face image browsing mode switch 62 is pressed down in step S97, the face image browsing mode is executed. The region of interest on the object's face image whose focus estimated position obtained in step S94 is the closest to the camera is enlarged to be displayed in step S98, and the face image N is set to "1". In this case, as the distance from the camera is greater, the face images N are "1", "2", . . . according to the focus detecting process in step S93.

Thereafter, the camera is in the input standby state in step S99. The state of the object switching button 38 is detected in step S100. The processes in steps S99 and S100 are repeated until the object switching button 38 is pressed down. When the pressing-down of the object switching button 66 is detected in step S100, the sequence goes to step S101, and a determination is made whether the face image N set in step S98 is N1.

The sequence goes to step S102 and N is incremented until the face image N is equal to N1. The face image of the object which is the N-th closest to the camera is enlarged to be displayed on the liquid crystal display 60 in step S104. On the other hand, when the face image N is equal to N1 in step S101, the sequence goes to step S103, and the face image N is set to "1" so that the first face image is displayed. Thereafter, when the original image is displayed in step S104, the camera is again in the input standby state of step S99.

According to the third embodiment, since the objects are switched to be displayed sequentially in order such that the focus estimated positions are closer to the camera, the faces and a good photographed state of the faces can be checked easily from the face image.

Also in the third embodiment, it goes without saying that the screen frame and the display region can be displayed on the liquid crystal display in the superimposing manner.

In the third embodiment, the face images are displayed in the order such that the focus estimated positions are closer to the camera, but on the contrary the face images may be displayed according to the order such that the objects are farther from the camera.

Also in the third embodiment, the face images are switched by the object switching button 66, but the present invention is not limited to this, and thus the four object switching buttons 80a to 80d may be used like the first modified example of the first embodiment.

A modified example of the third embodiment is explained below.

In the third embodiment, the order of the face images of the objects is determined according to their distances from the camera, but in the modified example of the third embodiment, the order of the face images of objects is determined according to the order such that object is closer to their best focus positions of the camera.

In the modified example of the third embodiment described above, since the constitution and the basic operation of the electric camera are the same as those in the first to the third embodiments, like members are designated by like reference numerals and the explanation thereof is omitted.

Figure 14:
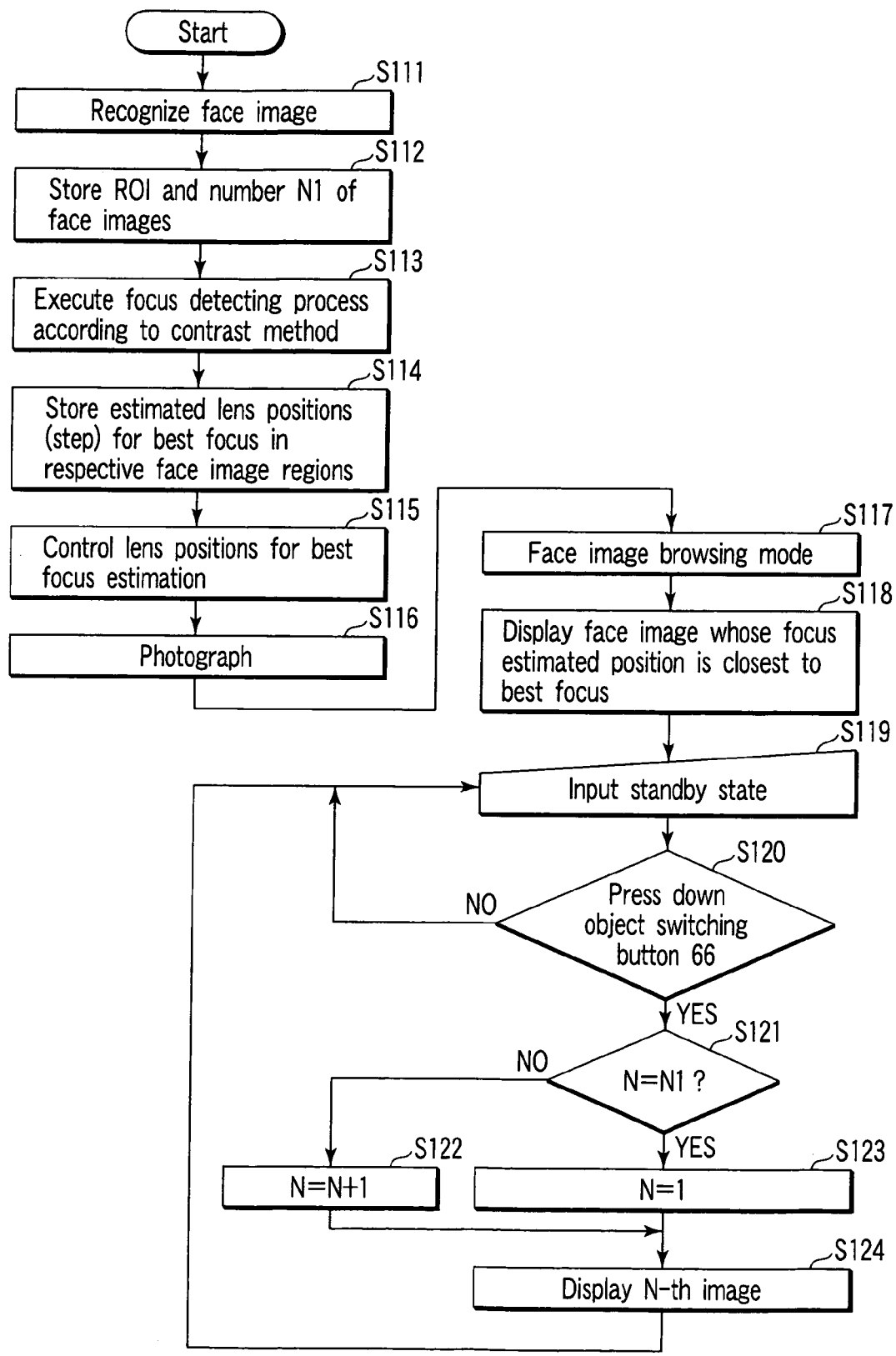
FIG. 14 is a flowchart explaining the operation for checking the face image in the electronic camera according to a modified example in the third embodiment of the present invention.

The operation for checking the face images in the electronic camera according to the modified example in the third embodiment of the present invention is explained below with reference to a flowchart in FIG. 14. Since the processing operations in steps S111 to S117 in the flowchart of FIG. 14 are the same as those in steps S91 to S97 in the flowchart of FIG. 13, only corresponding step numbers are referred to and the explanation thereof is omitted.

The region of interest relating to the object's face image whose focus estimated position obtained in step S114 is the closest to the best focus is enlarged to be displayed in step S118, and the face image N is set to "1". In this case, the face images N are set to "1", "2", . . . in this order such that the objects are farther from the best focus position according to the focus detecting process in step S93.

Thereafter, the camera is in the input standby state in step S119. The state of the object switching button 66 is detected in step S120. The processes in steps S119 and S120 are repeated until the object switching button 66 is pressed down. When the pressing-down of the object switching button 66 is detected in step S120, the sequence goes to step S121 so that a determination is made whether the face image N set in step S118 is N1.

The sequence goes to step S122 and N is incremented until the face image N is equal to N1. The face image of the object in the focus position which is the N-th closest from the best focus position is enlarged to be displayed on the liquid crystal display 60 in step S124. On the other hand, when the face image N is equal to N1 in step S121, the sequence goes to step S123, and the face image N is set to "1" so that the first face image is displayed. Thereafter, when the original image is displayed in step S124, the camera is again in input standby state of step S119.

According to the modified example of the third embodiment, since the face images are switched to be displayed sequentially in the order such that the focus estimated positions are farther from the best focus position of the camera, the faces and the good photographed state can be checked easily on the face images.

Also in the modified example of the third embodiment, it goes without saying that the screen frame and the display region can be displayed on the liquid crystal display in the superimposing manner.

In the modified example of the third embodiment, the face images are displayed in the order such that the focus estimated positions are separated from the best focus position of the camera, but on the contrary the face images of the objects may be displayed in the order such that the focus estimated positions approach the best focus position.

Also in the modified example of the third embodiment, the face images are switched by the object switching button 66, but the present invention is not limited to this, and the four object switching buttons 80a to 80d may be used similarly to the first modified example of the first embodiment.

The embodiments of the present invention have been explained above, but in addition to the above embodiments, the present invention can be variously modified without departing from the scope of the present invention.

According to the present invention, the electronic camera, which has a simple interface for checking faces and a good photographed state when a plurality of faces are photographed as objects, can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   an image processing section which recognizes face images from an object image obtained by picking up an image of an object, determines regions of interest corresponding to the recognized face images and performs an enlargement process;
   a display section which displays the face images obtained by the image processing section;
   an image operating section which, when a plurality of people are present in the object image, accepts an instruction for sequentially switching the face images to be displayed on the display section; and
   a control section which controls the face images so that they are sequentially switched to be displayed on the display section according to the instruction accepted by the image operating section;
   wherein the control section comprises:
   an acquiring section which acquires information relating to a focusing position of the image processing apparatus; and
   a display control section which controls face images closer to the focusing position indicated by the acquired information to be displayed first, when the face images are sequentially switched to be displayed on the display section.

2. The image processing apparatus according to claim 1, wherein the display control section controls the face images to be displayed on the display section in an order according to positions of the regions of interest of the face images with respect to a raster order.

3. The image processing apparatus according to claim 2, wherein the image processing section divides the object image into a plurality of divided regions, and the display control section controls the face images in the divided regions to be displayed on the display section in an order according to positions of the divided regions.

4. The image processing apparatus according to claim 1, wherein, when a plurality of people are present in the object image, the display control section controls the face images to be displayed on the display section in an order according to evaluated values for recognizing the face images.

5. The image processing apparatus according to claim 2, wherein the image operating section further comprises a change instructing section that changes a size of the face images to be displayed on the display section to a desired size.

6. The image processing apparatus according to claim 1, wherein the display control section controls positions on the object image where the face images to be displayed on the display section are present to be displayed on the display section in a superimposing manner.

7. An image processing apparatus comprising:
an image processing section which includes a distance measuring section that detects a distance to an object, recognizes face images from an object image obtained by picking up an image of the object through an imaging lens, determines regions of interest corresponding to the recognized face images and performs an enlargement process;
a display section which displays the face images obtained by the image processing section;
a storage section which, when a plurality of people are present in the object image, stores lens positions or estimated lens positions where focusing states of positions of the recognized face images become best;
an image operating section which accepts an instruction for sequentially switching the face images to be displayed on the display section according to information about the lens positions or estimated lens positions stored in the storage section; and
a control section which controls the face images so that they are sequentially switched to be displayed on the display section according to the instruction accepted by the image operating section;
wherein the control section comprises:
an acquiring section which acquires information relating to a focusing position of the image processing apparatus; and
a display control section which controls face images closer to the focusing position indicated by the acquired information to be displayed first, when the face images are sequentially switched to be displayed on the display section.

8. The image processing apparatus according to claim 7, wherein the display control section controls the face images to be displayed on the display section sequentially starting from face images in positions where the distance measuring section determines that the distance is shorter.

9. The image processing apparatus according to claim 7, wherein the display control section controls the face images to be displayed on the display section sequentially according to an order such that the face images are closer to focusing positions determined by the distance measuring section.

10. The image processing apparatus according to claim 7, wherein the display control section controls positions on the object image where the face images displayed on the display section are present to be displayed on the display section in a superimposing manner.

11. An image processing method which recognizes face images from an object image obtained by picking up an image of an object, and displays the face images obtained by an image processing section that determines regions of interest corresponding to the recognized face images and performs an enlargement process, said method comprising:
acquiring information relating to a focusing position of the image processing apparatus;
accepting an instruction for sequentially switching the face images to be displayed on the display section when a plurality of people are present in the object image; and
first displaying face images closer to the focusing position indicated by the acquired information, when the face images obtained by the image processing section are sequentially switched to be displayed.

12. A computer-readable medium having stored thereon a computer program which recognizes face images from an object image obtained by picking up an image of an object, and displays the face images obtained by an image processing section that determines regions of interest corresponding to the recognized face images and performs an enlargement process, said computer program controlling functions of:
acquiring information relating to a focusing position of the image processing apparatus;
accepting an instruction for sequentially switching the face images to be displayed on the display section when a plurality of people are present in the object image; and
first displaying face images closer to the focusing position indicated by the acquired information, when the face images obtained by the image processing section are sequentially switched to be displayed.

13. An electronic camera comprising:
an image processing section which recognizes face images from an object image obtained by picking up an image of an object, determines regions of interest corresponding to the recognized face images and performs an enlargement process;
a display section which displays the face images obtained by the image processing section;
an image operating section which, when a plurality of people are present in the object image, accepts an instruction for sequentially switching the face images to be displayed on the display section; and
a control section which controls the face images so that they are sequentially switched to be displayed on the display section according to the instruction accepted by the image operating section,
wherein the control section comprises:
an acquiring section which acquires information relating to a focusing position of the image processing section; and
a display control section which controls face images closer to the focusing position indicated by the acquired information to be displayed first, when the face images are sequentially switched to be displayed on the display section.

* * * * *